Aug. 3, 1965 N. S. GARDNER ETAL 3,198,466
ACCESSORY HOLDER FOR VEHICLE
Filed July 17, 1964 3 Sheets-Sheet 1

INVENTORS
NORMAN S. GARDNER
GENE RAUL
BY
ATTORNEYS

Aug. 3, 1965                N. S. GARDNER ETAL              3,198,466
                         ACCESSORY HOLDER FOR VEHICLE
Filed July 17, 1964                                      3 Sheets-Sheet 2

INVENTORS
NORMAN S. GARDNER
GENE RAUL
BY
ATTORNEYS

Aug. 3, 1965           N. S. GARDNER ETAL                3,198,466
                     ACCESSORY HOLDER FOR VEHICLE
Filed July 17, 1964                                  3 Sheets-Sheet 3

INVENTORS
NORMAN S. GARDNER
GENE RAUL
BY
ATTORNEYS

United States Patent Office 3,198,466
Patented Aug. 3, 1965

3,198,466
ACCESSORY HOLDER FOR VEHICLE
Norman S. Gardner, Westchester County, and Gene Raul, Bronx, N.Y., assignors to Raul International Corporation, New York, N.Y., a corporation of New York
Filed July 17, 1964, Ser. No. 383,322
5 Claims. (Cl. 248—205)

This invention relates to an improved holder for mounting an accessory device over the horn button of a vehicle. By way of illustration, and without limitation thereto, the holder or adapter is particularly suitable for mounting a clock, compass or other indicating device upon the horn button of an automobile.

As a particular feature of the invention, the holder has means adapting it for mounting upon horn buttons of various configurations, so that a single universal adapter device is provided for mounting clocks, compasses or the like in the automobile.

As an example of the usefulness of the holder, automobile clocks are relatively expensive as original equipment, are subject to going out of order and involve rather substantial costs for removing the clocks, repairing them and replacing them in the automobiles. Accordingly, a need has existed for providing a clock together with mounting means for locating the clock in readily accessible position for viewing by the driver, such mounting means being extremely simple so that the operator can install the clock himself without the need for using the services of a mechanic.

One important object of this invention is to provide a holder for mounting an accessory device, such as a clock, over the horn button of a vehicle, such holder having means for securing it firmly to the horn button with a single fastening member.

Another object of this invention is to provide a holder of the above-described type, which can be secured to horn buttons of varying sizes, without the need for any skill in adjustment on the part of the installer.

In accordance with the preferred embodiment of the invention, we take advantage of the fact that while horn buttons are of varying dimensions, in each instance the horn button has a top and a skirt depending from such top and radially clearing the periphery of the steering column over which the horn button is mounted, so that such skirt is accessible at its bottom edge and inner face to hooks. The holder in accordance with the invention comprises a body adapter to have the accessory device mounted thereon and having a top wall. Further in accordance with the invention, a boss is provided on the top wall having an upwardly inclined peripheral side surface and having a central depression with a peripheral wall. A screw-threaded stud is mounted in the depression upstanding from its bottom and spaced from the peripheral wall.

Further in accordance with the invention, the top wall has a plurality of apertures outside of the boss. A plurality of elongated, flexible, nonextensible straps are extended through the apertures. The bottom ends of the straps have hooks which can be engaged over the botom edge and inner face of the skirt. The straps have a plurality of holes therein in lengthwise spacing. The straps are hooked to the bottom of the skirt of the horn button, with the holder body resting upon the top of the horn button and with the straps extended through the pad and through the apertures and initially loosely over the top of the boss, with the top of the stud extending through appropriate apertures of the straps. A fastener, such as a wing nut, supplemented by a washer of diameter approximately equal to the diameter of the depression, is then screwed onto the stud and tightened down. The result is to draw the straps over the boss and downwardly against the bottom of the depression, thereby tightening the straps. The result is to secure the holder firmly to the horn button, while at the same time not interferring in any way with the operation of the horn button, as by means of the usual horn ring (although the horn button can be directly depressed by pressing downwardly upon the holder). Any suitable clock, compass or other device may be releasably secured to the holder by any suitable means.

It will be apparent that this construction is particularly advantageous, since the single wing nut secures the holder in place, without any need for skill by the operator in adjusting the holder horn buttons of different sizes, and without the need for any tools.

Other objects and advantages of the invention will become apparent from the following description, in conjunction with the annexed drawings, in which a preferred embodiment of the inventions is disclosed.

Figure 1:
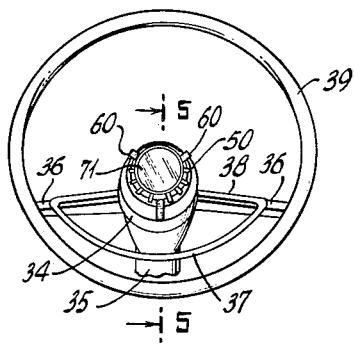
FIG. 1 is a top perspective view of the steering wheel of an automobile, showing the steering column and horn button and showing a holder and accessory device mounted on such horn button.

Upon reference to the drawing in detail, it will be noted that it shows a holder 10 for mounting an accessory device 50 over the horn button 30 of a vehicle.

The horn button 30 is the conventional horn button commonly associated with automobiles, trucks and other vehicles. Thus, the horn button 30 has a top wall 31 and a skirt 32 depending from such top 31, such skirt 32 being slightly tapered from top to bottom. The button 30 is telescoped over a housing 33 which extends through a sleeve element 34 of increased diameter which is mounted upon the steering column 35. It will be understood that these details of construction are conventional and can be varied. In the particular configuration shown, the important consideration is that the skirt 32 depending from the horn button top 31 is accessible at its bottom edge 32a and inner face 32b to hooks. The clearance space between the bottom edge 32a and the top of element 34 is sufficient to accept a relatively thin hook and still allow clearance for depression of the horn button in order to blow the horn.

Figure 2:
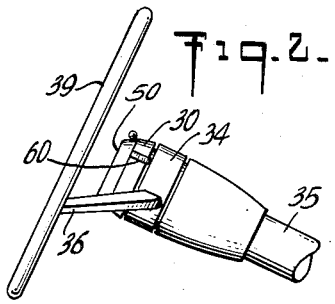
FIG. 2 is a side elevation of the assembly of FIG. 1.
Figure 2A:
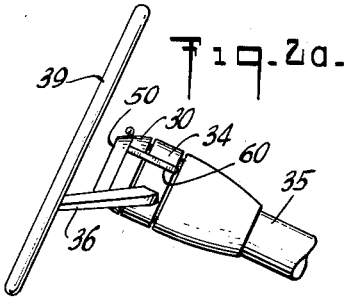
FIG. 2a is a view similar to FIG. 2, but showing another position of the steering column for hooking of the straps.

It is to be understood that in certain vehicles, a different horn configuration may be provided, but it has been found that in almost all vehicles there is some sort of a clearance space for reception of hooks for securing an attachment upon the top of the horn button. In the claims, the horn button is not a part of the combination as claimed, and it will be understood that reference in the claims to an accessory for use in conjunction with a horn button having a top and a skirt depending from said top and accessible at its bottom edge and inner face to hooks, will be understood to refer equally to any equivalent arrangement which will accept such hooks for use in securing an attachment to the top of the horn button. One such arrangement is shown in FIG. 2a, in which the element 34 is shaped to receive hooks.

As shown in the drawing, the steering wheel 39 surrounds the element 34 and is attached thereto by spokes 36. In addition, an arcuate horn rim 37 has generally radial spokes 38 which are secured to the outer periphery of horn button 32. The elements 37 and 38, for simplicity of illustration, are only shown in FIG. 1.

Holder 10 comprises a top wall 11 which is preferably disc-shaped, and a depending cylindrical peripheral side wall 12. The diameter of body 10 is preferably smaller than the diameter of horn button 30, so that the bottom edge of wall 12 may be seated upon the top 31 of horn button 30. Body 10 further comprises a boss 13 centrally located on the top wall 11. This boss 13 has a peripheral side wall 14 which is upwardly inclined from top wall 11. The top 15 of boss 13 is annular and convex, and connects at its inner edge with a depending cylindrical wall 16, the bottom which is closed by a flat wall 17. The walls 16 and 17 define a central depression 18 in boss 13 with wall 16 serving as the peripheral wall of such depression and wall 17 serving as the bottom of such depression. It will further be noted that the bottom wall 17 is located slightly below the level of wall 11.

Stud 19, screw-threaded at 19a, is located within depression 18 so as to be upstanding from its bottom 17 and spaced from its peripheral wall 16. The axes of stud 19 and wall 16 are coincident. While any suitable mounting means may be provided for stud 19, in the construction shown, the stud 19 is extended through aperture 20 in wall 17 and has an enlarged hexagonal head 21 against the bottom of wall 17 and received frictionally between flanges 22 depending from wall 17, so that the head 21 is nonrotatable. Any suitable means (not shown) may be provided to assemble the stud as shown, so as to prevent it from becoming separated from body 10.

The top wall 11 has a plurality of openings or apertures 23, located just outside wall 14. Optionally, there are three such apertures 23, equally spaced circumferentially. Preferably, the inner and outer walls 23a and 23b of opening 23 have the same inclination as the outer surface of wall 14. Preferably, the axis of each hole 23, if extended, would cross the bottom inner edge 12a of wall 12.

The body 10 is rigid, and it will be apparent from the foregoing that it can be readily molded from any suitable plastic. Of course, the invention is not limited to a plastic construction of body 10.

Figure 3:
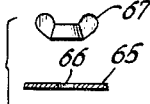
FIG. 3 is an exploded vertical section, partly in elevation, of the holder, in conjunction with the horn button.
Figure 3:
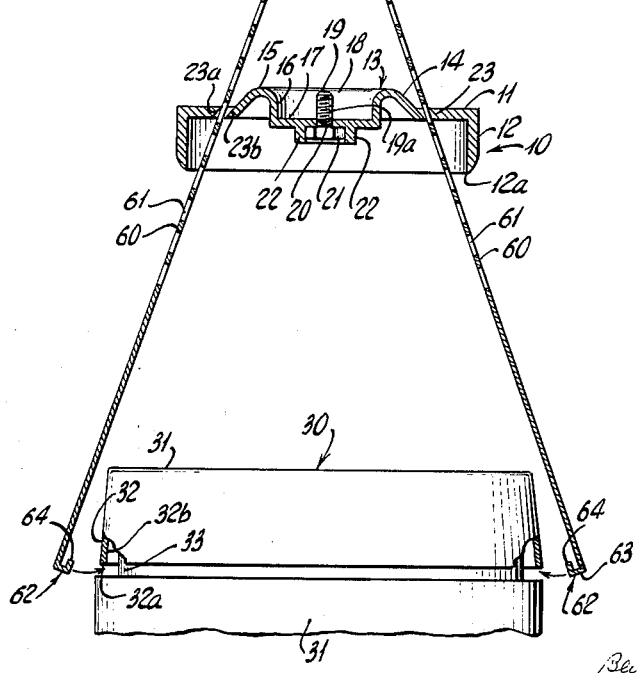
Figure 3A:
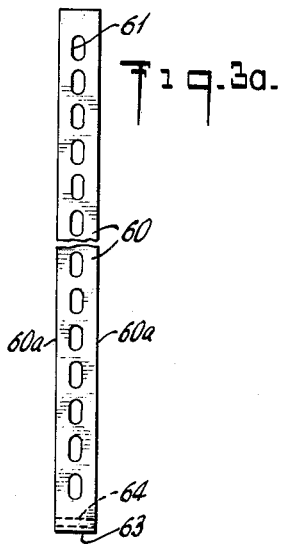
FIG. 3a is a fragmentary plan view of a holding strap in accordance with the invention.

Further in accordance with the invention, there are provided a plurality of straps 60 for securing body 10 to horn button 30. Preferably, there are three such straps 60, corresponding to the three apertures 23. Each such strap 60 is elongated with parallel side edges 60a and is made, by way of example, of soft, bendable metal. The straps 60 are preferably not made of springy material. Each strap 60 has, at least in its upper portion, a plurality of holes 61 which are spaced in the direction of length of strap 60. Each hole 61 optionally is slightly elongated lengthwise, the width of each hole 61 being approximately equal to the diameter of stud 19 so that the stud 19 may be extended readily through hole 61 with some play in the direction of length of the strap. The holes 61 are spaced apart by an amount slightly less than the length of said holes 61. For convenience of illustration, FIG. 3 shows the holes 61 only in the upper portion of the strap.

Figure 4:
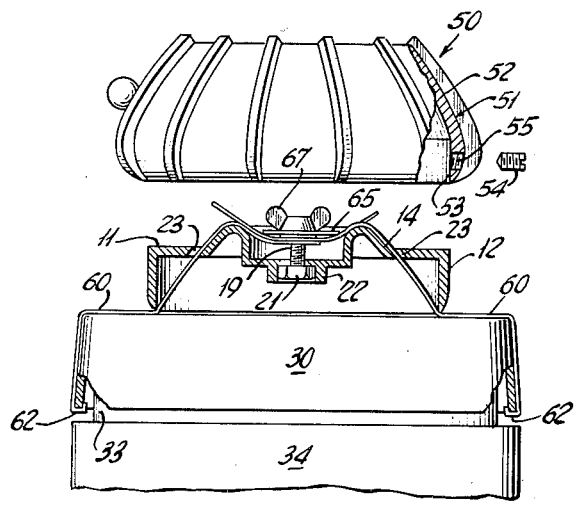
FIG. 4 is an exploded side elevation, partly in vertical section, of the holder, while being mounted upon the horn button, together with an accessory device.
Figure 5:
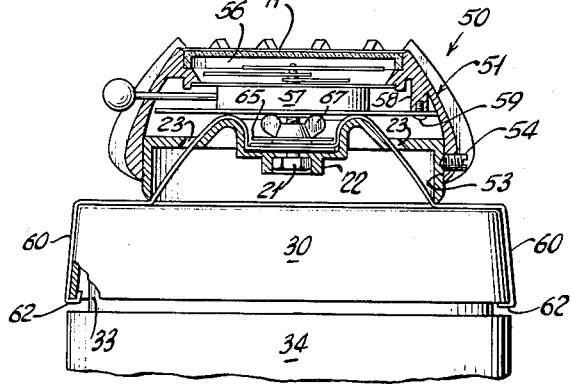
FIG. 5 is a vertical sectional view on line 5—5 of FIG. 1, partly in elevation, similar to FIG. 4 but showing the holder fully mounted upon the horn button and the accessory device in mounted position upon the holder.

The bottom of each strap 60 is provided with a hook 62, preferably integral with the strap. Thus, the strap 60 can be bent at its lower end to provide a flange 63 at right angles thereto and a further flange 64 extending upwardly from flange 63 and parallel to the main portion of strap 60. The hook 62 is sized and shaped so that it is engageable over the bottom edge 32a and inner face 32b of skirt 32, with flange 64 against the face 32b and flange 63 against the edge 32a. Preferably, the skirt 32 fits frictionally between the main portion of strap 60 and the flange 64, as shown in FIGS. 4 and 5. It will be understood that the hook 62 may be similarly engaged over the element 34, as shown in FIG. 2a.

Each of the straps 60 is dimensioned so that it can be readily passed through an aperture 23.

The straps 60 may be secured to body 10 by means of washer 65 and wing nut 67. Washer 65 has a diameter approximately equal to the diameter of depression 18 and has a central hole 66 through which stud 19 may be extended. The wing nut 67 is adapted to be screwed upon stud 19.

In the assembly of body 10 to horn button 30, the straps 60 are first extended through the openings 23 with the hooks 62 below body 10. The hooks 62 may then be engaged with horn button 30 in the manner described above and as shown in FIGS. 2, 4 and 5. Body 10 may then be lowered until it rests upon the straps 60 and the top 31 of horn button 30, as shown in FIG. 4. The straps 60 are drawn through the openings 23 so that the straps 60 lie flush against the outer periphery of horn button wall 32, and also flush against the horn button top 31, until the straps pass under and against the lower inner edge 12a of body wall 12. The straps 60 extend from such edge 12a substantially straight and at the same inclination as the outer periphery of wall 14, through the openings 23 and flush against the outer surface of wall 14. The configuration of the straps also clearly shown in FIG. 4.

The straps further extend across the top of depression 18, and it will be apparent that each strap has a hole 61 which is then in vertical alignment with the axis of stud 19. The portions of the straps 60 overlying the depression 18 are then bent slightly downwardly so that the stud 19 enters the appropriate holes 61 of the three crossed straps 60. Washer 65 is next located above the straps with stud 19 extending through the washer opening 66, and the wing nut 67 is then screwed upon the top of stud 19, again as clearly shown in FIG. 4. Body 10 is thus loosely secured to horn button 30, ready for the final tightening operation.

Figure 7:
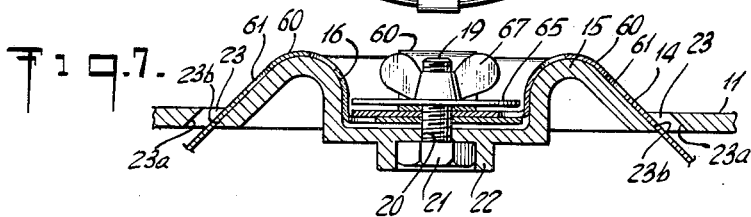
FIG. 7 is a fragmentary vertical section, to enlarged scale, of the holder showing the manner in which the fastening device tightens the straps upon the boss.

As shown in FIG. 5, the wing nut 67 is then screwed downwardly upon stud 19, drawing washer 65 and the upper strap ends downwardly. Each strap 60 is thereby located between the outer edge of washer 65 and the inner face of wall 16. Accordingly, the tightening of the wing nut causes the strap to be drawn downwardly relative to the wall 16, as clearly apparent from FIGS. 4 and 5. FIG. 7 is a detail corresponding to FIG. 5, to enlarged scale, further illustrating the principle of the invention. It will be apparent that as the result of the manner in which the strap is drawn downwardly, through the tightening of the wing nut, the strap must be correspondingly drawn upwardly along the side of the horn button and through the openings 23. The result is to secure the hooks tightly against the bottom of the horn button, and thereby to fix the body 10 securely, yet releasably, to the horn button 30. Any overlapping ends of the soft straps 60 can then be cut off, for example, by a scissors, or else may be simply bent so that they lie against body 10 and do not extend beyond the periphery thereof.

Any suitable accessory may be secured to holder 10, with the advantages of the invention being that the accessory can completely conceal the upper strap ends and the boss 14, which aids in achieving an attractive appearance of the combined holder and accessory device.

Figure 6:
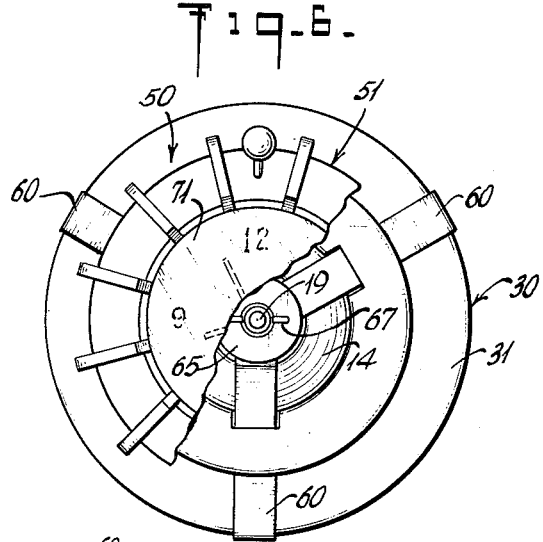
FIG. 6 is a top plan view of the assembly of FIG. 5, partly broken away and showing the accessory device as a clock.

One such accessory device 50 is shown in detail in FIGS. 4, 5 and 6, and is there shown in the form of a casing 51 containing a clock 56. The accessory device 50 will not be described in detail, except to the extent necessary to the understanding of the invention. The casing 51 includes a peripheral side wall 52, the lower portion of which has a generally cylindrical inner surface 53 which can be extended in closely fitted relationship over the outer surface of the holder side wall 12. One or more setscrews 54 can be extended through a correspondingly screw-threaded radial opening 55 in wall 51, such opening 55 being in the lower portion of the wall and opening upon its surface 53. Accordingly, the setscrew 54 may be screwed against wall 12 and even slightly into the wall so as to hold the casing 51 rigidly but releasably to the holder 10. Side wall 52 extends a substantial distance above the upper level of boss 13. The clock 56 includes a works 57 which is fixed to an internal boss 58 of housing wall 52, by means of screw 59. The upper opening of the casing is closed by a clock face 71. This clock face 71 is of disc shape and has a downwardly extending cylindrical peripheral flange 72 which is received in a seat 73 formed in the top of wall 52.

The disc 71 is transparent and has the usual time markings thereon. The remainder of the clock works is of any suitable type and is not described in detail. The important consideration is that the housing 51, together with the works contained therein, are fixed by an suitable means to the holder, with the upper part of the holder concealed. As a result, the operator sees mainly the attractive casing 51, together with a small portion of the holder which can also be attractively molded, and together finally with the unobtrusive strap lengths which extend around the horn button.

Figure 8:
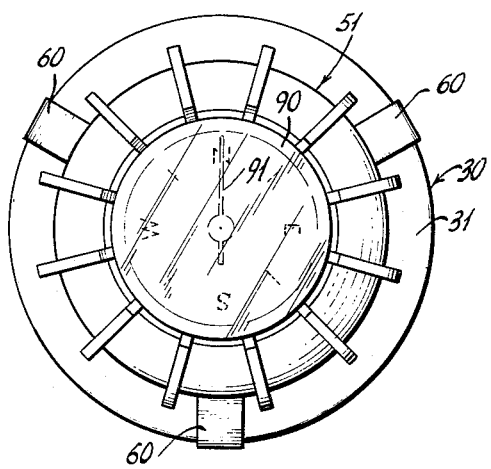
FIG. 8 is a view similar to FIG. 6, but showing the accessory device as a compass.

As shown in FIG. 8, any other suitable works may be substituted for the clock works of FIG. 5 and other views. Thus, FIG. 8 shows the top of the housing having mounted therein a dial 90 marked with direction indications, and with the usual compass needle 91. The details of the compass are conventional are not shown, but it will be apparent that the holder is particularly useful for mounting a compass conspicuously, easily and removably over the horn button in convenient position for viewing.

It will be apparent that other casings of any suitable configuration may be mounted upon the holder, and that any suitable instrument may be mounted in such casing, such as a transistor radio or other types of equipment.

While preferred embodiments of the invention have been disclosed, and various possible changes, omissions and additions have been indicated therein, it will be apparent that various other changes, omissions and additions may be made in the invention without departing from the scope and spirit thereof.

What is claimed is:

1. Holder for mounting an accessory device over the horn button of a vehicle, said horn button having the described combination and arrangement of a top and a skirt depending from said top and accessible at its bottom edge and inner face to hooks, said holder comprising a body adapted to have the accessory device mounted thereon and sized and adapted to be seated upon the horn button top, a boss on the top of said body having an upwardly inwardly inclined peripheral side surface, said boss having a central depression with a bottom and a peripheral wall, a stud in said depression upstanding from its bottom and spaced from its peripheral wall, said body having a plurality of through generally vertical openings outside said boss, a plurality of elongated flexible, nonextensible straps having hooks on their lower ends engageable over the bottom edge and inner face of said skirt, said straps adapted to be extended through said openings and respectively having a plurality of holes therein in lengthwise spacing, and a fastener adapted to be secured on said stud, said adapter adapted to be assembled to said horn button with said body seated on said horn button top and said hooks engaged over the bottom edges and inner face of said skirt and said straps extended through said apertures and against the side surface of said boss with said stud through holes in said straps, said fastener adapted to be mounted on said stud over and against said straps and moved down on said stud to draw said straps over said boss to said depression bottom whereby to tension said straps and fix said body against said horn button.

2. Holder for mounting an accessory device over the horn button of a vehicle and the like, said holder comprising a body adapted to have the accessory device mounted thereon and sized and adapted to be seated upon the horn button top, a plurality of elongated flexible, nonextensible straps having hooks on their lower ends for engagement on the vehicle below the horn button, said straps respectively having a plurality of holes therein in lengthwise spacing, said body having a plurality of circumferentially spaced, generally vertically extending openings through which said straps are adapted to be extended with the hooks below the body, the top of said body having a central depression inwardly of and extending below the upper ends of said body openings, said straps adapted to be overlapped in overlying relation to said depression, and fastening means comprising a first fastener member fixed to the bottom of said depression and a second fastener member securable to said first fastener member in overlying relation to said straps, said fastening means including means adapted to be extended through holes of said straps, said second fastener member being adapted to be secured to said first fastener member and moved relative thereto toward the bottom of said depression to draw said straps toward the bottom of said depression and thereby exert tension upon said hooks.

3. Holder according to claim 1, the outer surface of said peripheral wall of said boss being downwardly outwardly inclined, said openings in said top wall of said body being correspondingly inclined, the axes of said openings intersecting the lower inner edge of said side wall of said body.

4. Holder for mounting an accessory device on an article, said holder comprising a body adapted to have the accessory device mounted thereon and having a top, said body having a plurality of circumferentially spaced, generally vertically extending through passages, a plurality of elongated, flexible, nonextensible straps sized and adapted to be extended frictionally slidably through said passages for immovable connection of said straps below said body to said article, said straps respectively having a plurality of holes therein in lengthwise spacing above said body, the top of said body having a central depression radially inwardly of and extending below the upper ends of said passages, said straps being adapted to be bent inwardly from the upper ends of said passages so as to extend generally horizontally over said depression in overlapping relation, and fastening means for extension through the holes of the respective overlapping strap portions for connecting said overlapping strap portions to the bottom of said depression, said fastening means adjustable from above said depression to draw said overlapping strap portions downwardly towards said bottom of said depression whereby to draw said straps upwardly and tensioningly within said passages and clamp said holder against said article.

5. Holder for mounting an accessory device on an article, said holder comprisnig a body adapted to have the accessory device mounted thereon and having a top, said body having a top boss having an upwardly inwardly inclined peripheral side surface and having a central depression, said body having a plurality of through generally vertically extending openings outside and closely adjacent said boss, a plurality of elongated, flexible, nonextensible straps sized and adapted to be extended frictionally and slidably through said openings and against said peripheral side surface of said boss for immovable connection of said straps below said body to said article, said straps respectively having a plurality of holes therein in lengthwise spacing above said body, said straps being adapted to be bent inwardly from the upper end of said boss so as to extend generally horizontally over said depression in overlapping relation, and fastening means for extension through the holes of the respective overlapping strap portions and for connecting said overlapping strap portions to the bottom of said depression, said fastening means adjustable from above said depression to draw said overlapping strap portions downwardly towards said bottom of said depression whereby to draw such straps upwardly and tensioningly through said openings and against said side surface of said boss so as to clamp said holder against said article.

References Cited by the Examiner

UNITED STATES PATENTS

| | | | |
|---|---|---|---|
| 1,170,223 | 2/16 | Dale | 248—114 |
| 1,328,930 | 1/20 | Stern | 248—231 |
| 1,858,564 | 5/32 | See | 248—231 |
| 2,849,203 | 8/58 | Trank | 248—115 |
| 2,908,470 | 10/59 | Garman | 248—231 |
| 3,011,802 | 12/61 | Ackerman | 281—15 |
| 3,061,339 | 10/62 | Jewell | 285—236 |
| 3,105,714 | 10/63 | Kimber | 294—312 |

CLAUDE A. LE ROY, *Primary Examiner*

FRANK L. ABBOTT, *Examiner.*